United States Patent [19]

Norén

[11] Patent Number: 4,895,022
[45] Date of Patent: Jan. 23, 1990

[54] ARRANGEMENT IN PRECIPITATION GAUGES

[76] Inventor: Bengt Norén, Jädråås 4560, S-816 00 Ockelbo, Sweden

[21] Appl. No.: 235,888
[22] PCT Filed: Feb. 16, 1987
[86] PCT No.: PCT/SE87/00077
§ 371 Date: Aug. 18, 1988
§ 102(e) Date: Aug. 18, 1988
[87] PCT Pub. No.: WO87/05116
PCT Pub. Date: Aug. 27, 1987

[30] Foreign Application Priority Data

Feb. 20, 1986 [SE] Sweden .................... 8600761

[51] Int. Cl.⁴ .............................. G01W 1/14
[52] U.S. Cl. ..................................... 73/171
[58] Field of Search .......... 73/170 R, 171, 28, 863.22, 73/863.23, 863.52, 863.53; 340/601, 602

[56] References Cited

U.S. PATENT DOCUMENTS

| | | |
|---|---|---|
| 2,497,759 | 2/1950 | Cappleman, Jr. ............. 73/171 |
| 3,359,795 | 12/1967 | Walsh ............................ 73/189 |
| 3,372,586 | 3/1968 | Chadwick . |
| 3,487,684 | 1/1970 | Chadwick . |
| 4,140,011 | 2/1979 | Krupa et al. ................. 73/171 |
| 4,499,761 | 2/1985 | Plank et al. . |

FOREIGN PATENT DOCUMENTS 569296 11/1975 Switzerland .

OTHER PUBLICATIONS

"Accuracy of Canadian Snow Gage Measurements", Barry E. Goodison, Journal of Applied Meterology, vol. 17, No. 10, Oct. 1978.

Primary Examiner—Charles A. Ruehl
Attorney, Agent, or Firm—McFadden, Fincham, Marcus & Allen

[57] ABSTRACT

The invention relates to an arrangement in precipitation gauges of the type comprising a transducer tube having an inlet opening (2) at the top. In association with the inlet opening (2) of the tube (1), there is provided a collar or disc (3) extending transversely of or at an angle to the longitudinal axis of the tube and serving to protect the area above the opening from the influence of any wind field distortion that may occur around the transducer, FIG. 1.

13 Claims, 2 Drawing Sheets

ARRANGEMENT IN PRECIPITATION GAUGES

TECHNICAL FIELD OF THE INVENTION

This invention relates an arrangement in precipitation gauges of the type comprising a transducer having a substantially vertically directed tube provided with an inlet opening at the top.

BACKGROUND OF THE INVENTION

In pluviometry by means of conventional transducers having some type of collecting vessel, one of the predominant measuring errors is the so-called aerodynamic error, the magnitude of which is substantially dependent upon the transducer type, wind conditions and drop size. The reason for this error is that the wind field around the transducer is distorted by the transducer itself. This distortion in turn results in a change of the paths of the water drops. For example, in a substantially cylindrical transducer, this distortion implies e.g. an increase in wind velocity and a change of wind direction above the opening of the transducer, such that the drops of water are spread and fewer drops will descend through the opening of the transducer than would have descended through the corresponding area had there been no transducer.

Many methods have been suggested in order to solve the above-mentioned problem. One method which has given improved results lies in placing the transducer in the ground with its opening at ground level. If this is correctly done, the wind field above the inlet opening will not notably deviate from what would have been the case without any transducer there. However, for practical reasons it is unsuitable to place the transducer in the ground. In fact, considerable advantages would be gained by instead placing the transducer at an optional height above ground level, e.g. at the height of a man, for this would considerably facilitate the handling of the transducer. For such measuring equipments as have been placed at a certain height above ground level, various wind shields or screens have been suggested, all aiming at reducing the magnitude of the aerodynamic error.

Also when measuring snow and other precipitation, such as hail, the same type of aerodynamically conditioned errors exist as in pluviometry. Because of the larger volume-to-weight ratio of snow as compared with water drops, the effect of a distortion of the wind field will become correspondingly greater in the case of snow. The possibility of improving the measuring results by placing the transducer in the ground is however not at hand in this case, at least for continuous measurements in wintry climates. One method that has been suggested to solve this problem is placing a collecting vessel in an extended mat of level-cut shrub vegetation. In this case, the vegetation should be so thick that the wind is almost zero therein. At the same time, it should be so thin that the snow flakes can descend through the level-cut surface and so high that a sufficiently large amount of snow can be accumulated. In practice, this method is however also unsatisfactory. Further, for snow gauges mounted above ground level, a number of different wind shields have been suggested, which have however but poorly improved the measuring results.

BRIEF DESCRIPTION OF THE INVENTIVE CONCEPT

The present invention aims at overcoming the above-related drawbacks in prior-art precipitation gauges and at providing an arrangement dramatically enhancing measuring accuracy. According to the features of the invention, this object is achieved in that there is provided in association with the inlet opening of the transducer or transducer tube, a collar or disc extending transversely of or at an angle to the vertical longitudinal axis of the tube and serving to restrict the area above the opening from the influence of any wind field distortion that may occur around the transducer.

BRIEF DESCRIPTION OF THE ACCOMPANYING DRAWINGS

In the drawings,

FIG. 1 is a part sectional perspective view illustrating a first embodiment of the inventive arrangement, FIG. 2 is a vertical section of the same arrangement, FIG. 3 is a perspective showing an alternative, further developed embodiment of the inventive arrangement, and FIG. 4 is a vertical section of the embodiment shown in FIG. 3.

DETAILED DESCRIPTION OF PREFERRED EMBODIMENTS OF THE INVENTION

Figure 1:
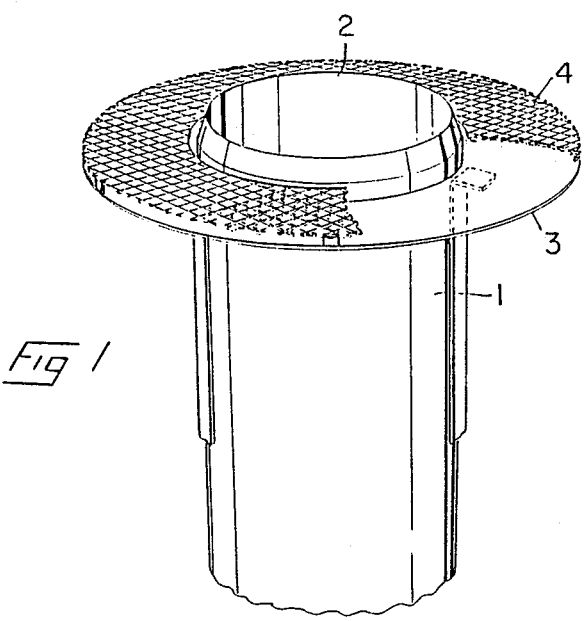
Figure 2:
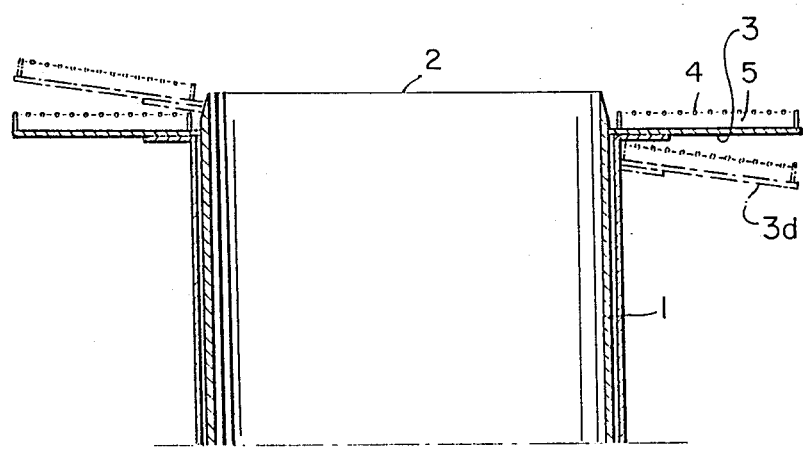

In FIGS. 1 and 2, reference numeral 1 generally designates a rain gauge in the form of a substantially vertically oriented tube which in the illustrated embodiment has a cylindrical shape. At the top, the tube has an inlet opening 2 through which the precipitation particles can descend. The transducer tube 1 may either be in the form of a container with a bottom, in which the precipitation can be collected, or consist of a downwardly open duct through which the precipitation particles can descend. In practice, the illustrated tube may have a diameter of about 160 mm and a thickness of 0.5-3 mm. The upper edge of the tube may advantageously be bevelled in the manner shown in the figures.

According to the inventive principle, there is provided in conjunction with the inlet opening 2, a collar 3 which is in the form of an annular disc surrounding the tube 1, and which extends transversely of, in this case at right angles to the vertical longitudinal axis of the tube. The circular periphery of the disc 3 should be located outside the area where the wind field is appreciably affected by the transducer. In practice, the disc 3 should therefore have a diameter at least twice the diameter of the tube. The illustrated arrangement is based on the principle that a current of air is but very little influenced by a thin, planar disc placed in the current of air, if the disc is oriented in the direction of the current. Therefore, the illustrated disc or collar will efficiently screen the area above the opening of the transducer tube from any influence of the wind field distortion produced around the transducer, the disc 3 itself giving rise to but a very small distortion of the wind field above the transducer. As previously pointed out, the disc 3 in the illustrated embodiment is annular so as to yield a central hole through which the tube 1 projects a slight distance, while the rest of the transducer tube is located below the disc. Above the disc, the wind is allowed to sweep past without being appreciably affected other than in the very thin boundary layer produced immediately above the disc. With a correct design of the transition between the disc and the opening, the wind flow above the opening of the transducer will not be appreciably affected either. Hence, the paths of the rain drops will not be affected, either above the disc-shaped collar or above the opening of the transducer, before the drops impinge on the collar or descend through the opening.

In order to prevent part of the rain falling on the collar or flange 3 from splashing into the opening of the transducer tube, it is suggested in a preferred embodiment to so devise the top face of the collar that the rain drops impinging on it will be absorbed without any splashing. In the illustrated embodiment, this has been realized by providing an apertured member 4 above the disc 3. In the illustrated embodiment, the member 4 is a screen cloth or a fine-meshed net which is placed at a certain distance above the disc 3 so as to define a gap 5 between the disc and the net member. In practice, the distance between the disc 3 and the net member 4 may be 3–5 mm. Essential in this respect is that the distance is so large that no water bodies can form on the disc and build up to reach the net member so as to form a surface against which impinging rain drops could splash. The rain drops which hit the net member or screen cloth will, independently of the angle of incidence, be decelerated and disintegrated and eventually drop onto the subjacent collar without splashing.

The opening 2 of the transducer tube should be separated from the collar such that the water collected on the collar cannot flow into the opening. As illustrated in the drawings, this can be achieved by allowing the upper edge of the tube to project one or a few millimeters above the net member 4 or the collar 3. To facilitate drainage of water from the upper face of the collar 3, this face can be provided with drain holes and, optionally, be designed slightly conical so as to facilitate water run-off, the net member however retaining its planar form.

If the underlying ground is substantially horizontal, the collar 3 should be placed with its plane substantially horizontal, so that the mean vector of the wind, here normally turbulent, will become parallel to the collar. However, if the ground is sloping, the collar can be inclined at a corresponding angle of inclination as shown in dotted outline at 3a in FIG. 2.

The amount of water received can be measured by conventional, automatic or manual methods. It is obvious that a transducer of the type described above, when placed in a turbulent wind field in the indicated manner, may give rise to disturbances affecting the measuring result. This may be the case during brief moments when the direction of the wind vector deviates essentially from the plane of the collar. The total effect of such possible disturbances on the measuring result is however very small as compared with those measuring errors which are had in gauges of traditional design.

Figure 3:
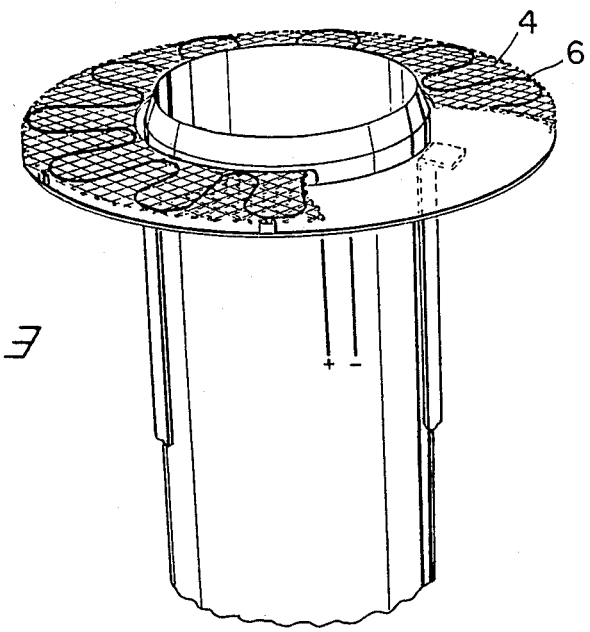
Figure 4:
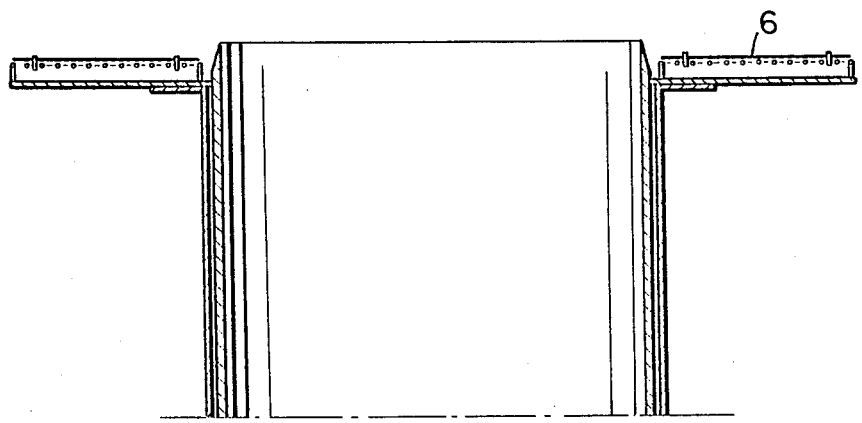

In FIGS. 3 and 4, there is shown a further developed embodiment which is also suitable as a snow gauge. In this instance, the upper face of the collar, or more precisely the upper face of the net member 4, has been equipped with at least one resistance wire 6 which can be electrically heated in order to maintain the area around the net member heated to a temperature above 0° C. The resistance wire should be suitably electrically insulated so that it can be placed in proper thermal contact with the net member or screen cloth. If the screen cloth consists of metal, which is preferred in this case, the resistance wire can be arranged in such an open pattern that the capacity of the cloth to absorb water drops without any splashing is not notably deteriorated. Because of the good heat-conducting properties of the metal cloth, it is possible, despite the open pattern, to reliably maintain the entire surface of the cloth above 0° C.

If, as illustrated in FIG. 3, the resistance wire is disposed at the upper face of the screen cloth 4, the advantage is gained that a still rougher surface is obtained. This further reduces the risk of snow flakes bouncing or rolling on the surface at high wind speeds. Otherwise, this increased roughness does not affect the measuring result to any appreciable extent. The power supplied to the resistance wire should be so controlled that all snow falling on the collar in one snowfall will have time to melt and that too high temperatures are avoided between snowfalls. The snow falling on the collar will adhere to the surface thereof and melt, and thereafter be drained in the same way as water drops. During a snowfall, the surface of the entire collar will often be wet, which further improves the capacity of the surface to catch the snow flakes. For adequate drainage, it may be necessary to coat the underside of the collar and other parts of the transducer with a heat-insulating layer and to provide for heating of those portions of the transducer which are important for the drainage.

POSSIBLE MODIFICATIONS OF THE INVENTION

Naturally, the invention is not restricted only to the embodiments described in the foregoing and illustrated in the drawings. For instance, it is conceivable to let the net member alone form a distortion breaking collar. In other words, this would eliminate the need of an underlying disc or plate. Instead of just a screen cloth or a net, it is of course possible to use other suitable members capable of decelerating and disintegrating the precipitation in order to absorb it without any splashing, such as a bristled mat or the like. Snow on the disc may of course be melted or otherwise removed than by electrical heating.

The term "tube", as used in the foregoing description and in the accompanying claims, should of course be interpreted in its broadest sense. Thus, the transducer tube is not restricted to cylindrical containers but may consist of any suitably designed element defining an opening through which the precipitation can descend, for instance a funnel, a ring etc.

It should further be pointed out that the collar need not necessarily be directly associated with the outside of the transducer tube, as illustrated in the drawings. Thus, the collar may have such a large inner diameter that an air gap is formed between the tube and the collar. If this gap is made sufficiently wide, the requirement that the surface of the collar should absorb drops without any splashing is reduced, and it is even conceivable to dispense with the net member illustrated. In such an embodiment, it is however essential that the gap is sealed in a suitable manner to prevent the wind from blowing through it. This can be achieved by mounting a downwardly converging or tapering neck plate with suitable drain holes between the inner edge of the collar and the outer side of the tube.

It should also be stressed that the drawings merely illustrate the basic principle of the invention and are not meant to illustrate the commercial design of the precipitation gauge in its every detail. Thus, in practice, the outer edge of the collar can be closely connected to the outer edge of the net member, for instance in that the collar, either in its entirety or along its periphery, is given a conical shape.

I claim:

1. In an arrangement in a precipitation gauge of the type comprising a transducer including a tube having a vertical axis and provided with an inlet opening at the top, the improvement wherein there is provided in association with the inlet opening of the tube, a planar disc extending transversely of said vertical axis of the tube and serving to restrict the area above said opening from the influence of any wind field distortion that may occur around the transducer.

2. Arrangement as claimed in claim 1, wherein the planar disc has the form of a circular disc.

3. Arrangement as claimed in claim 1, characterized in that said planar disc is an apertured member.

4. Arrangement as claimed in claim 3, characterized in that there is provided in association with said apertured member, at least one electrically heated resistance wire serving, when required, to melt snow or hail adhering to said member.

5. Arrangement as claimed in claim 3, wherein said apertured member is in the form of a fine-meshed net or a stretched screen cloth.

6. Arrangement as claimed in claim 1, characterized in that said planar disc is a bristled liquid-permeable mat through which the precipitation particles can pass.

7. Arrangement as claimed in claim 1, wherein said planar disc extends normal to said vertical axis.

8. Arrangement as claimed in claim 1, wherein said planar disc extends at an inclined angle to said vertical axis.

9. In an arrangement in a precipitation gauge of the type comprising a transducer including a tube having a vertical axis and provided with an inlet opening at the top, the improvement wherein there is provided in association with the inlet opening of the tube, a planar disc extending transversely of said vertical axis of the tube and serving to restrict the area above said opening from the influence of any wind field distortion that may occur around the transducer, and an apertured member mounted above said disc to receive and decelerate descending precipitation particles before they reach the disc to thereby avoid splashing.

10. Arrangement as claimed in claim 9, wherein said apertured member is spaced from said disc.

11. Arrangement as claimed in claim 9, wherein said apertured member is a fine-mesh net or screen cloth.

12. In an arrangement in a precipitation gauge of the type comprising a transducer including a tube having a vertical axis and provided with an inlet opening at the top, the improvement wherein there is provided in association with the inlet opening of the tube, a planar disc extending transversely of said vertical axis of the tube and serving to restrict the area above said opening from the influence of any wind field distortion that may occur around the transducer, and a bristled liquid-permeable mat mounted above said disc to receive and decelerate descending precipitation particles before they reach the disc to thereby avoid splashing.

13. Arrangement as claimed in claim 12, wherein said bristled liquid-permeable mat is spaced from said disc.

* * * * *